United States Patent

[11] 3,616,174

| [72] | Inventor | John Stuart Atkins |
| | | Redditch, England |
| [21] | Appl. No. | 675,047 |
| [22] | Filed | Oct. 13, 1967 |
| [45] | Patented | Oct. 26, 1971 |
| [73] | Assignee | Alkaline Batteries Limited |
| | | Redditch, England |
| [32] | Priority | Oct. 17, 1966 |
| [33] | | Great Britain |
| [31] | | 46323/66 |

[54] JOINTS FOR INSULATING ELECTRICALLY CONDUCTIVE SURFACES
2 Claims, No Drawings

| [52] | U.S. Cl. | 161/162, 161/165, 161/168, 161/DIG. 5 |
| [51] | Int. Cl. | B32b 3/00 |
| [50] | Field of Search | 161/168, 185, 162 |

[56] References Cited
UNITED STATES PATENTS

| 3,331,729 | 7/1967 | Danielson et al. | 161/DIG. 5 |
| 3,388,027 | 6/1968 | Altman | 161/168 |
| 3,079,289 | 2/1963 | George, Jr. et al. | 161/DIG. 5 |
| 3,203,849 | 8/1965 | Katz et al. | 161/185 |
| 3,383,337 | 5/1968 | Garling et al. | 161/168 |

*Primary Examiner*—Robert F. Burnett
*Assistant Examiner*—Raymond O. Linker, Jr.
*Attorney*—Watson, Cole, Grindle & Watson

ABSTRACT: An adhesive for mechanically securing together but electrically insulating two surfaces, which may be electrically conducting, comprising an epoxy resin mixed with small glass spheres.

JOINTS FOR INSULATING ELECTRICALLY CONDUCTIVE SURFACES

This invention relates to adhesives.

According to the present invention an adhesive comprises a fluid bonding material having dispersed in it a solid particulate spacing material adapted to hold apart the surfaces being bonded. The term "fluid bonding material" as used herein is intended to include a liquid bonding material, usually a viscous liquid, or a paste. The fluid bonding material may be a natural or synthetic polymeric plastics adhesive or a resin adhesive. It may be one which forms a bond from a fluid state and does not have to be allowed to dry partially before articles to be bonded are brought together. Conveniently, it is an epoxy resin, for example that sold by Bakelite Ltd., or that sold by Minnestoa Mining and Manufacturing Co. Ltd. under the trade name SCOTCH CAST, or that sold by Ciba (United Kingdom) Ltd. under the trade name ARALDITE.

Preferably the spacing material is of substantially uniform particle size and the particles have the same overall dimensions in different directions. For example they may be in the form of cubes or tetra-hedra but preferably they are of generally spherical form, conveniently of between 0.5 and 2 mm. diameter. In general, the larger the particle size, the more viscous will the bonding material be.

The adhesive in accordance with the invention may be employed in any application where it is desired to space apart the surfaces being bonded as well as to secure them together. Thus the material is applicable for example, where thermal insulation is required, but the invention is primarily concerned with applications in which electrical insulation between the two surfaces to be bonded is required. Thus in a preferred form of the invention both the bonding material and the spacing material are electrically insulating.

A further aspect of the invention includes a joint formed with an adhesive as set forth above, in particular a joint mechanically securing together but electrically insulating two electrically conducting surfaces.

The following example further illustrates the invention.

EXAMPLE

An adhesive is formed by mixing small glass spheres, commercially obtainable under the name ballotini, with an epoxy resin. The ballotini are graded to a uniform diameter corresponding to the desired spacing between the surfaces. In a typical mix there might be 100 ballotinis of 0.5 mm. average diameter per square inch of joint area, the resin being that sold under the trade name ARALDITE.

The proportion of bonding material to spacing material is not critical but the amount of bonding material should be more than sufficient to fill the voids between the spacing material. The ballotini can be dispersed sufficiently uniformly through the adhesive mix to give effective distribution of spacers when the adhesive is spread on the components to be joined.

The two surfaces to be joined, for example the metal containers of adjacent cells of an alkaline battery, will be coated with the mixture and brought together, if necessary with some to-and-fro movement, in order to ensure that the ballotini arrange themselves in a single layer.

The combined insulation and bonding of surfaces by means of an adhesive in accordance with the invention can effect considerable simplification in design and cost of assembly as compared with other methods of securing surfaces together, and at the same time insulating them from one another.

What I claim as my invention and desire to secure by Letters Patent is:

1. An insulating joint comprising:
   a pair of spaced electrically conductive surfaces,
   an insulating adhesive for bonding said surfaces in spaced relationship,
   said insulating adhesive including a single layer of solid spherical insulating particles having a substantially uniform diameter selected from a range of diameters between 0.5 mm. and 2.0 mm., and
   wherein the spacing between said surfaces is substantially equal to the selected diameter of said spherical insulating particles.

2. A joint as in claim 1 wherein said solid spherical insulating particles are glass spheres and the density distribution of said glass spheres is approximately 100 per square inch of joint area.